United States Patent [19]
Wagner

[11] Patent Number: 6,106,054
[45] Date of Patent: Aug. 22, 2000

[54] DEVICE FOR IMPROVING DRIVEABILITY OF A ROAD VEHICLE AND ROAD VEHICLE USING SUCH A DEVICE

[75] Inventor: Arnold Wagner, Winterthur, Switzerland

[73] Assignee: Peraves AG, Winterthur, Switzerland

[21] Appl. No.: 09/117,362

[22] PCT Filed: Nov. 29, 1997

[86] PCT No.: PCT/CH97/00451

§ 371 Date: Jul. 20, 1998

§ 102(e) Date: Jul. 20, 1998

[87] PCT Pub. No.: WO98/23478

PCT Pub. Date: Jun. 4, 1998

[30] Foreign Application Priority Data

Nov. 29, 1996 [CH] Switzerland .......................... 2937/96

[51] Int. Cl.[7] .................................................. B62D 37/02
[52] U.S. Cl. ............................ 296/180.5; 296/180.1
[58] Field of Search ........................ 296/180.1, 180.5, 296/180.3

[56] References Cited

U.S. PATENT DOCUMENTS 4,174,863   11/1979   Gotz ........................................ 296/1 S

FOREIGN PATENT DOCUMENTS 5-77769    9/1991   Japan ................................. 296/180.5
6-247347   2/1993   Japan ................................. 296/180.5

*Primary Examiner*—Dennis H. Pedder
*Assistant Examiner*—Mickki D. Murray
*Attorney, Agent, or Firm*—Townsend and Townsend and Crew LLP

[57] ABSTRACT

The device, which may be used singly or multiply in road vehicles, for improving the driving characteristics includes at least one freely rotatable guide fin, whose first pivotal axis is connected to the vehicle structure, and, above the guide fin, an upwardly projecting control fin, which is pivotable about a second pivotal axis and which adjusts the guide fin by means of air force in order to achieve predetermined guide forces in dependence on its deflection, with respect to the guide fin.

12 Claims, 1 Drawing Sheet

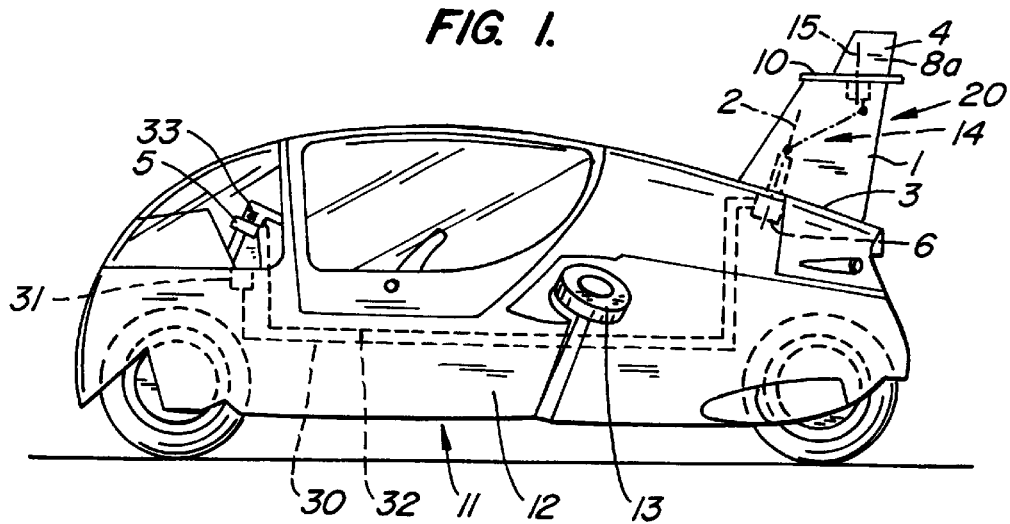
FIG. 1.
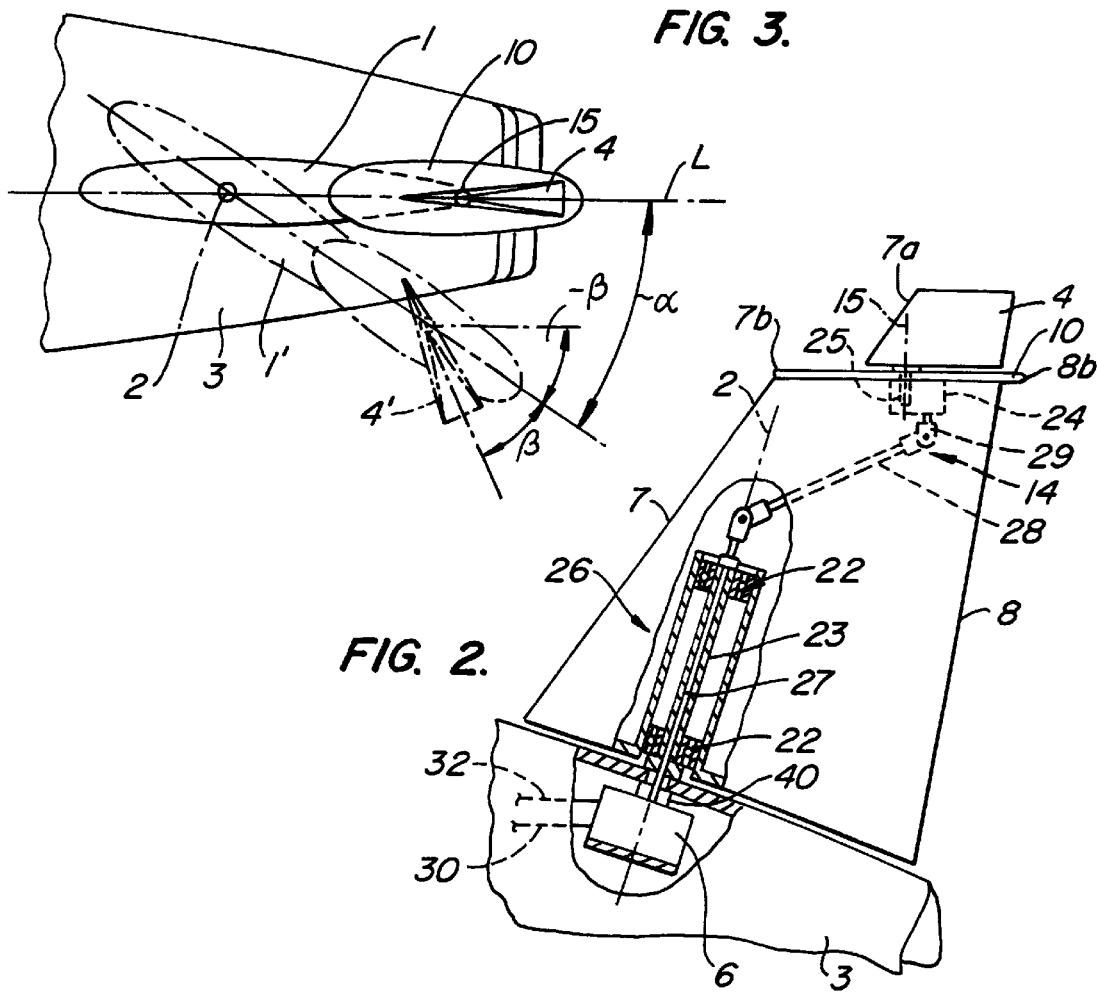
FIG. 3.
FIG. 2.

DEVICE FOR IMPROVING DRIVEABILITY OF A ROAD VEHICLE AND ROAD VEHICLE USING SUCH A DEVICE

BACKGROUND OF THE INVENTION

1. Field of the Invention

The invention relates to a device for improving the driving characteristics of a road vehicle which includes at least one upwardly projecting guide fin coupled to a control fin arranged on a pivotal axis.

2. Description of the Prior Art

The driving characteristics of road vehicles are determined on the one hand by wheels rolling in contact with the road, crawler tracks or sliding runners and their steering. On the other hand, aerodynamic forces act on the vehicle body while driving and possibly, in the case of open vehicles, on passengers and/or the load, which, in the form of air resistance, cause deceleration and, particularly in the case of a cross wind and/or turbulence, can disturb the driving characteristics. In order to reduce the deceleration effect, the superstructural components of road vehicles are streamlined, if possible, and designed with small cross-sectional areas. The center of the longitudinal sectional surfaces should be situated at or behind the center of gravity of the vehicle for reasons of stability.

In the case of open vehicles, such as motorcycles, attempts are made to reduce the deceleration effect and to improve the stability by means of fairings which deflect the air flow caused by movement of the vehicle partially around or over the passenger or passengers. In the case of two track vehicles, e.g. cars, it is known to arrange horizontal guide surfaces (spoilers) at the front and/or rear ends of the vehicles, which exert downward air forces on the vehicle and thus produce a larger ground pressure to transmit correspondingly larger frictional forces by virtue of an increased loading on the vehicle suspension.

Furthermore, devices of the type referred to above are known which e.g. include two vertical, fixedly arranged guide fins on the rear of the vehicle extending in the longitudinal direction of the vehicle. By virtue of such guide fins, air forces for improving the directional stability may be transmitted to the vehicle on the one hand but on the other hand, by virtue of the correspondingly increased longitudinal sectional area of the vehicle, its stability in the transverse direction, and thus the driving characteristics under the action of transverse forces, e.g. in the event of a cross wind, can be impaired.

SUMMARY OF THE INVENTION

It is the object of the invention to provide a device of the type referred to above which is further developed, particularly in this regard, which ensures an improved directional stability in comparison to previous constructions under unfavourable driving conditions, particularly those which are impaired by the action of transverse forces, and which at the same time makes an effective improvement of the stability of the vehicle in the transverse direction possible.

The device constructed in accordance with the invention permits unimpeded adjustment movements of the guide fin, which is coupled to the control fin, about the first pivotal axis, in accordance with the air forces acting at any time on the guide fin in the longitudinal and transverse directions and at the same time enables automatic positioning of the guide fin in an aerodynamically effective, defined operational position which is determined by the deflected position of the control fin and the transverse force acting on it. The construction, in accordance with the invention thus enables the production of lateral air forces which, in contrast to previous constructions with fixedly arranged guide fins, are scarcely altered by a cross wind and/or turbulence. As a result, a nearly uniform force effect is exerted on the vehicle by the device, even under variable wind conditions, corresponding to the current deflected position of the control fin relative to the guide fin. The device in accordance with the invention is suitable for single track and multi-track vehicles. With single track vehicles, a substantial improvement of the driving characteristics may be achieved under unfavourable conditions, particularly with a cross wind or turbulence, at high velocity and with a low coefficient of friction of the road. In the case of multi-track vehicles, transverse forces can be produced when driving around corners which, in comparison to previous constructions, permit an increase in the possible cornering speeds and bring about a reduction in the inclination of the vehicle structure towards the outside of the bend.

BRIEF DESCRIPTION OF THE DRAWINGS

FIG. 1 is a side view of a road vehicle with a device constructed in accordance with the invention for improving the driving characteristics of the vehicle, FIG. 2 is a partly sectioned, enlarged scrap view of the device shown in FIG. 1, and FIG. 3 is an enlarged scrap plan view of the device shown in FIG. 1.

DETAILED DESCRIPTION OF THE PREFERRED EXEMPLARY EMBODIMENTS

The road vehicle in FIG. 1, which as shown is a single track cabin motorcycle 11 with a cockpit including a steering device 5, a closed vehicle body 12 and outrigger roller 13 which may be swung out on both sides, includes a device 20 for improving the driving characteristics, particularly for stabilizing and/or steering the vehicle. The device 20 includes an upwardly projecting guide fin 1 in the rear region of the vehicle, which may be orientated in the longitudinal direction of the vehicle, and an upwardly projecting control fin 4 arranged above the latter which may also be orientated in the longitudinal direction of the vehicle. The guide fin 1 is freely pivotally connected to the vehicle body 12 about an upright first pivotal axis 2, which, as shown, is substantially perpendicular to a bodywork section 3. The control fin 4 is pivotally connected to the guide fin 1 about a substantially perpendicular second rotational axis 15, which is rearwardly offset with respect to the rotational axis 2 of the guide fin 1, and is coupled by means of a connecting arrangement 14 to the guide fin 1 to be deflectable relative to the latter about the second rotational axis 15 and to be fixable in at least one position inclined at an angle $\beta$. The guide fin 1 thus adjusts itself, while driving, about the first rotational axis 2 with an angle of attack $\alpha$ with respect to the longitudinal central plane L (FIG. 3) of the vehicle determined by the swung out position of the control fin 4.

The air flow caused by movement of the vehicle and/or meteorologically determined air movements produces air forces in the described construction on the control fin 4 corresponding to its position with respect to the direction of the incident flow which are transmitted via the second rotational axis 15 behind the first rotational axis 2 to the guide fin 1 and thus move it to a position in the flow determined by the relative angle $\beta$ between the two fins 1 and 4. This has the consequence that a defined air force is exerted on the guide fin 1 which is transmitted via the first rotational axis 2 to the vehicle structure 3 and which thus makes a direct influence on the stability and/or the steering of the vehicle possible.

As shown, a substantially horizontally arranged baffle 10 can be connected to the upper end of the guide fin 1, by means of which the air flows acting on the guide fin 1 and the control fin 4 can be separated from one another. The air forces producible by the guide fin 1 can thus on the one hand be increased and on the other hand the effectiveness of the pivotal displacement of the control fin 4 with respect to the guide fin 1 can be increased.

As shown in FIG. 3, the guide fin 1 can be constructed with an aerodynamic airfoil profile by means of which the air forces which may be produced can be increased and discontinuities, particularly flow separation, can be prevented. The control fin 4 can have a similar profile or, as shown, an approximately wedge shaped profile. Embodiments with flat guide and/or control fins are also possible.

As will be clear, in particular, from FIG. 2, the guide fin 1 is mounted by means of a bearing arrangement, in the illustration by means of roller bearings 22, so as to be freely rotatable about the rotational axis 2 on a support tube 23 which is fixedly connected to the vehicle body. The connecting arrangement 14 includes an adjusting element mounted in the guide fin 1, as shown a gear unit 24, which is coupled to a journal 25 on the control fin 4 mounted in the guide fin 1, and a control device 26 which may be controlled by the steering device 5 of the vehicle. The control device 26 includes a positioning element, a servo motor 6 in the drawings, which is arranged in the vehicle body 12 and which may be coupled to an adjusting shaft 29 of the gear unit 24 by means of a control shaft 27, which is mounted in the support tube 23, and a universal-jointed shaft 28. The servo motor 6 is connected via a control line 30 to a control unit 31, which is coupled to the steering device 5. The servo motor 6 can also be connected via a further control line 32 to at least one sensor 33 by which a stability parameter of the vehicle, e.g. course, lateral inclination, incident air flow, velocity, transverse acceleration, oscillation and the like is detected and corresponding control signals transmitted to the servo motor 6.

The guide fin 1 and the control fin 4 are coupled by means of the gear unit 24 so as to be shiftable between at least two coupled positions such that when the guide fin 1 is deflected through an angle of attack α to the longitudinal direction of the vehicle a deflection in the same sense through a proportional angle of inclination β is transmitted to the control fin 4 in the one coupled position, and in the other coupled position an opposite deflection is transmitted to it through an angle of inclination-β (FIG. 3). In embodiments with the guide fin 1 arranged on the rear of the vehicle, as shown, a deflection of the guide fin in the same sense produces a stabilization of the vehicle caused by air forces about its vertical axis by a type of "weather vane effect" corresponding to an increase of the longitudinal sectional area behind the center of the vehicle. A deflection in the opposite sense produces an air force opposite to the effects of a side wind which results in an automatic inclination of the vehicle about the longitudinal axis against the wind direction.

The time necessary for the deflection of the guide fin 1 by the control fin 2 is determined by the magnitude of the moment of inertia of the device about the first rotational axis 2 in addition to the geometrical relationships of the device, the angle of deflection β and the dynamic pressure of the flow. The mass distribution about this axis of rotation 2 can be used to control movements about the roll axis wherein an excess weight of the device in front of the rotational axis 2 has a roll damping effect and one behind the rotational axis 2 has a roll promoting effect.

The control fin 4 can be pivoted via the control device 26 by the steering device 5 of the vehicle about the second rotational axis 15 and thus, by virtue of the corresponding deflection of the control fin 1 about the first rotational axis 2, an air force produced which inclines the illustrated, single track vehicle in the steered direction about its longitudinal axis. In a multi-track vehicle, which is not illustrated, an air force can be produced with a corresponding device which, when driving around bends, counteracts the centrifugal force and tilting of the vehicle structure and thus makes higher speeds around bends possible.

By means of the positioning element 6 the displacement of the control fin 4 about the second rotational axis 15 via the steering device 5 and/or in dependence on control signals from at least one sensor 33 can be effected, by means of which an appropriate stabilization effect may be achieved in a measurement dependent manner, e.g. as regards direction holding, levelling, wind correction, oscillation damping etc. With this construction the guide fin 1 can thus be used directly for steering and for stability improvement by means of air force.

Both the guide fin 1 and also the control fin 4 achieve optimum effects when they are directly acted on by the wind caused by movement of the vehicle and are thus mounted outside turbulent boundary layers or stagnant regions, i.e. projecting beyond the vehicle structure. In order to minimize impact damage in the event of collisions and to satisfy the requirements of the law for road vehicles, the guide fin 1, the control fin 4 and the baffle plate 10 can each be constructed with a rounded leading edge 7, 7a and 7b, respectively, which is inclined rearwardly and/or comprises a resilient material and optionally with a corresponding trailing edge 8, 8a, 8b, respectively. Furthermore, components of the bearing arrangements in the region of the rotational axes 2 and 15, e.g. the control shaft 27, the support tube 23 and/or the journal 25 can comprise a material which is resilient under the action of a predetermined impact force and which makes the formation of a predetermined breaking point possible.

The normal setting of the deflection angle β between the guide fin 1 and the control fin 4 can be altered by an adjustment means 40 that is provided in the connecting arrangement 14, in or on the positioning element 6 in the illustrated embodiment, and thus vehicle trimming can be achieved, e.g. for the purpose of compensating for a loading on one side.

What is claimed is:

1. A device for improving the driving characteristics of a road vehicle, the device comprising:

at least one upwardly projecting guide fin for attachment to the vehicle, the guide fin being freely pivotable about an upright first pivotal axis; and at least one upwardly projecting control fin that is arranged above a top surface of the guide fin, the at least one upwardly projecting control fin being pivotally mounted on the guide fin about an upright second pivotal axis, the control fin being coupled to the guide fin by means of a connecting arrangement so as to be deflectable about the second pivotal axis relative to the guide fin and to be fixable in at least one deflected position, the control fin being configured such that it may be oriented in the longitudinal direction of the vehicle.

2. A device in accordance with claim 1 wherein at least the guide fin is constructed with an aerodynamic air foil profile.

3. A device for improving the driving characteristics of a road vehicle, the device comprising:

at least one upwardly projecting guide fin arranged on the vehicle and extending over a longitudinal section of the vehicle, the guide fin being mounted on the vehicle body so as to be freely pivotable about an upright first pivotal axis;

at least one upwardly projecting control fin that is arranged above the guide fin, the at least one upwardly projecting control fin being pivotally mounted on the guide fin about an upright second pivotal axis, the control fin being coupled to the guide fin by means of a connecting arrangement so as to be deflectable about the second pivotal axis relative to the guide fin and to be fixable in at least one deflected position, the control fin being configured such that it may be oriented in the longitudinal direction of the vehicle;

wherein the connecting arrangement includes at least one adjusting element that may be coupled to the guide fin and the control fin, the at least one adjusting element being adjustable into at least two coupled positions; and wherein when the guide fin is deflected through an angle of attack α with respect to its normal position extending in the longitudinal direction of the vehicle, a deflection in the same sense is transmissible, in the one coupled position, to the control fin through a deflection angle β with respect to the guide fin and, in the other coupled position, an opposite deflection is transmissible to the guide fin through a deflection angle β with respect to the guide fin.

4. A device in accordance with claim 1 wherein the connecting arrangement includes a control device that may be coupled to the control fin and may be controlled from a steering device of the vehicle, the control device including a positioning element for pivoting the control fin about the second pivotal axis.

5. A device in accordance with claim 4 wherein the control device includes at least one sensor for detecting at least one stability parameter of the vehicle and transmitting corresponding control signals to the positioning element.

6. A device in accordance with claim 1 wherein at least one of the guide fin and the control fin are constructed with a respective rounded leading edge.

7. A device in accordance with claim 1 wherein at least one of the guide fin and the control fin are constructed with a respective rearwardly inclined leading edge.

8. A device in accordance with claim 1 wherein at least a portion of at least one of the guide fin and the control fin is constructed from a material that is resilient under the action of a predetermined impact force.

9. A device for improving the driving characteristics of a road vehicle, the device comprising:

at least one upwardly projecting guide fin for attachment to the vehicle, the guide fin being freely pivotable about an upright first pivotal axis; and at least one upwardly projecting control fin that is arranged above a top surface of the guide fin, the at least one upwardly projecting control fin being pivotally mounted on the guide fin about an upright second pivotal axis, the control fin being coupled to the guide fin by means of a connecting arrangement so as to be deflectable about the second pivotal axis relative to the guide fin and to be fixable in at least one deflected position, the control fin being configured such that it may be oriented in the longitudinal direction of the vehicle; and wherein a substantially horizontally extending baffle plate is arranged between the guide fin and the control fin.

10. A device in accordance with claim 1 wherein the connecting arrangement between the guide fin and the control fin includes an adjusting means for altering the normal position of the control fin with respect to the guide fin.

11. A road vehicle comprising at least one control device, the at least one control device comprising:

at least one upwardly projecting guide fin arranged on the vehicle and extending over a longitudinal section of the vehicle, the guide fin being mounted on the vehicle body so as to be freely pivotable about an upright first pivotal axis; and at least one upwardly projecting control fin that is arranged above a top surface of the guide fin, the at least one upwardly projecting control fin being pivotally mounted on the guide fin about an upright second pivotal axis, the control fin being coupled to the guide fin by means of a connecting arrangement so as to be deflectable about the second pivotal axis relative to the guide fin and to be fixable in at least one deflected position, the control fin being configured such that it may be oriented in the longitudinal direction of the vehicle.

12. A device in accordance with claim 1 wherein the control fin is constructed with an approximately wedge shaped profile having a leading edge and a trailing edge, the wedge shaped profile being arranged to converge from the trailing edge to the leading edge.

* * * * *